(12) United States Patent
Xu et al.

(10) Patent No.: US 12,502,236 B2
(45) Date of Patent: Dec. 23, 2025

(54) MASTER-SLAVE MOTION CONTROL METHOD, ROBOT SYSTEM, DEVICE, AND STORAGE MEDIUM

(71) Applicant: BEIJING SURGERII ROBOTICS COMPANY LIMITED, Beijing (CN)

(72) Inventors: Kai Xu, Beijing (CN); Haozhe Yang, Beijing (CN); Baibo Wu, Beijing (CN); Xiang Wang, Beijing (CN)

(73) Assignee: BEIJING SURGERII ROBOTICS COMPANY LIMITED, Beijing (CN)

( * ) Notice: Subject to any disclaimer, the term of this patent is extended or adjusted under 35 U.S.C. 154(b) by 199 days.

(21) Appl. No.: 18/013,496

(22) PCT Filed: Jun. 30, 2021

(86) PCT No.: PCT/CN2021/103725
§ 371 (c)(1),
(2) Date: Dec. 28, 2022

(87) PCT Pub. No.: WO2022/002155
PCT Pub. Date: Jan. 6, 2022

(65) Prior Publication Data
US 2023/0293252 A1 Sep. 21, 2023

(30) Foreign Application Priority Data
Jul. 1, 2020 (CN) .......................... 202010627477.8

(51) Int. Cl.
*A61B 34/37* (2016.01)
*A61B 34/00* (2016.01)
*A61B 34/20* (2016.01)

(52) U.S. Cl.
CPC .............. *A61B 34/37* (2016.02); *A61B 34/20* (2016.02); *A61B 34/77* (2016.02);
(Continued)

(58) Field of Classification Search
CPC ......... A61B 34/37; A61B 34/20; A61B 34/77; A61B 34/70; A61B 2034/2059;
(Continued)

(56) References Cited

U.S. PATENT DOCUMENTS 7,155,315 B2 * 12/2006 Niemeyer .............. A61B 34/70
9,107,686 B2 8/2015 Moon et al.
(Continued)

FOREIGN PATENT DOCUMENTS

| CN | 107662195 A | 2/2018 |
| CN | 109171978 A | 1/2019 |

(Continued)

OTHER PUBLICATIONS

Extended European Search Report in related European Application No. 21832370.7 dated Jul. 5, 2024 (9 pages).
(Continued)

*Primary Examiner* — Ramon A. Mercado
*Assistant Examiner* — Ellis B. Ramirez
(74) *Attorney, Agent, or Firm* — Bayes PLLC (57) ABSTRACT

A master-slave motion control method, a robot system, a device, and a storage medium are provided. The master-slave motion control method includes: determining a current pose of a master manipulator, the current pose including a current position and a current posture; determining a target pose of a slave tool based on the current pose of the master manipulator and a pose relationship between the master manipulator and the slave tool; and generating a control signal for the slave tool based on the target pose of the slave tool. Teleoperation of the slave tool by the master manipulator can be implemented, and the control precision of the teleoperation of the slave tool by the master manipulator can be improved.

19 Claims, 2 Drawing Sheets

(52) U.S. Cl.
CPC ............... *A61B 2034/2059* (2016.02); *A61B 2034/2065* (2016.02); *A61B 2034/2072* (2016.02)

(58) Field of Classification Search
CPC .... A61B 2034/2065; A61B 2034/2072; A61B 2034/302; A61B 90/361; B25J 9/1689; G05B 2219/40188; G05B 2219/40195; G05B 2219/40138; G05B 2219/40184
USPC ............... 700/245, 246, 264; 706/12, 16, 22
See application file for complete search history.

(56) References Cited

U.S. PATENT DOCUMENTS

| | | | |
|---|---|---|---|
| 9,457,469 B2 | 10/2016 | Hazan et al. | |
| 2008/0180392 A1* | 7/2008 | Kishi | A61B 34/37 |
| 2009/0036902 A1* | 2/2009 | DiMaio | A61B 8/12 |
| 2011/0257480 A1* | 10/2011 | Takahashi | A61B 1/00147 |
| 2012/0221145 A1* | 8/2012 | Ogawa | B25J 13/02 |
| 2012/0328395 A1* | 12/2012 | Jacobsen | B66F 9/18 |
| 2013/0178978 A1* | 7/2013 | Kim | B25J 9/00 |
| 2017/0050310 A1* | 2/2017 | Kanaoka | B25J 13/088 |
| 2018/0250086 A1* | 9/2018 | Grubbs | A61B 34/35 |
| 2020/0198120 A1* | 6/2020 | Hashimoto | B25J 19/02 |
| 2020/0360097 A1* | 11/2020 | DiMaio | A61B 34/35 |

FOREIGN PATENT DOCUMENTS

| | | |
|---|---|---|
| CN | 109955254 A | 7/2019 |
| CN | 110421558 A | 11/2019 |
| CN | 110464471 A | 11/2019 |
| CN | 110559083 A | 12/2019 |
| CN | 110769773 A | 2/2020 |
| EP | 1970169 A2 | 9/2008 |
| JP | 6289755 B2 | 3/2018 |
| KR | 20140022907 A | 2/2014 |
| WO | 2016203858 A1 | 12/2016 |

OTHER PUBLICATIONS

Japanese Office Action in related Japanese Application No. 2022-580285 dated Dec. 26, 2023 (8 pages).
International Search Report and Written Opinion in related PCT Application No. PCT/CN2021/103725 dated Sep. 28, 2021 (11 pages).
Search Report in related Korean Application No. 10-2022-7041042 dated Feb. 26, 2025 (6 pages).
Search Report in related Chinese Application No. 202110744664.9 dated Feb. 25, 2025 (2 pages).
Search Report in related Chinese Application No. 2021107446649 dated Jun. 19, 2025 (2 pages).

* cited by examiner

MASTER-SLAVE MOTION CONTROL METHOD, ROBOT SYSTEM, DEVICE, AND STORAGE MEDIUM

CROSS-REFERENCE TO RELATED APPLICATIONS

The present application is a national stage of International Application No. PCT/CN2021/103725, filed on Jun. 30, 2021, which claims priority to Chinese Patent Application No. 202010627477.8, filed on Jul. 1, 2020. The entire contents of each of the above-identified applications are expressly incorporated herein by reference.

TECHNICAL FIELD

The present disclosure relates to the field of robots, and in particular to a master-slave motion control method, a robot system, a device, and a storage medium.

BACKGROUND

With the development of science and technology, medical robots have been rapidly developed in assisting medical staff in performing a surgery, which cannot only help the medical staff make a series of medical diagnosis and adjuvant treatment, but can also effectively relieve the shortage of medical resources.

Generally, a medical robot includes a slave tool for performing operations and a master manipulator for controlling the motion of the slave tool. In an actual scenario, the slave tool is configured to be able to enter an operating area, and the medical staff controls the motion of the slave tool in the operating area by teleoperating the master manipulator, thereby implementing a medical operation. Generally, the medical robot implements the motion control of the slave tool by the master manipulator through motion conversion between the master manipulator and the slave tool.

A surgical robot requires an extremely high operation precision and human-machine interaction experience. For example, the surgical robot may collect an image of the slave tool through a camera, and displays the image through a display. An operator (for example, a surgeon) obtains a position and a posture of the slave tool through the image in the display, and controls the position and the posture of the slave tool by teleoperating the master manipulator. Thus, positions and postures of the camera and the display may affect the direction and distance for a next operation of the operator. Therefore, there is a need to improve the precision of master-slave motion control of the surgical robot, thereby achieving the consistency between a target result of the master-slave motion control between the master manipulator and the slave tool and the operator's sensory intention.

SUMMARY

In some embodiments, the present disclosure provides a master-slave motion control method, the method including: determining a current pose of a master manipulator, the current pose including a current position and a current posture; determining a target pose of a slave tool based on the current pose of the master manipulator and a pose relationship between the master manipulator and the slave tool; and generating a control signal for the slave tool based on the target pose of the slave tool.

In some embodiments, the present disclosure provides a robot system, the robot system including: a master manipulator, which includes a mechanical arm, a handle arranged on the mechanical arm, and at least one master-manipulator sensor arranged at at least one joint of the mechanical arm, where the at least one master-manipulator sensor is operable to obtain joint information of the at least one joint; a slave tool, which includes a flexible arm body and an end instrument; at least one driving apparatus operable to drive the flexible arm body of the slave tool; at least one driving-apparatus sensor coupled to the at least one driving apparatus and operable to obtain driving information; and a control apparatus in communication connection with the master manipulator and the at least one driving apparatus, where the control apparatus is configured to: determine a current pose of the master manipulator, the current pose including a current position and a current posture; determine a target pose of the slave tool based on the current pose of the master manipulator and a pose relationship between the master manipulator and the slave tool; and generate a control signal for the slave tool based on the target pose of the slave tool.

In some embodiments, the present disclosure provides a computer-readable storage medium for storing at least one instruction that, when executed by a computer, causes a robot system to perform a master-slave motion control method, the method including: determining a current pose of a master manipulator, the current pose including a current position and a current posture; determining a target pose of a slave tool based on the current pose of the master manipulator and a pose relationship between the master manipulator and the slave tool; and generating a control signal for the slave tool based on the target pose of the slave tool.

BRIEF DESCRIPTION OF DRAWINGS

In order to explain the technical solutions in embodiments of the present disclosure more clearly, the accompanying drawings used in the description of the embodiments of the present disclosure will be briefly described below. The accompanying drawings in the following description show merely some of the embodiments of the present disclosure, and for those of ordinary skill in the art, other embodiments would also have been obtained from contents of the embodiments of the present disclosure and these accompanying drawings without involving any inventive effort.

DETAILED DESCRIPTION

In order to make the technical problems to be solved by the present disclosure, the technical solutions used in the present disclosure, and technical effects achieved by the present disclosure clearer, the technical solutions of the embodiments of the present disclosure will be described in detail below in conjunction with the accompanying drawings. Obviously, the described embodiments are merely exemplary, rather than all of, the embodiments of the present disclosure.

In the description of the present disclosure, it should be noted that location or position relationships indicated by terms such as "center", "up", "down", "left", "right" "vertical", "horizontal", "inside", and "outside" are based on location or position relationships shown in the accompanying drawings and are merely for ease of description of the present disclosure and simplification of the description, rather than indicating or implying that the apparatuses or elements referred to must have a specific location or be constructed and operated in a specific location, and therefore cannot be construed as limiting the present disclosure. In addition, the terms "first" and "second" are merely for the purpose of illustration, and should not be construed as indicating or implying the relative importance. In the description of the present disclosure, it should be noted that unless explicitly specified and defined otherwise, the terms "mounting", "connecting", "connection", and "coupling" should be understood in a broad sense, for example, they may be a fixed connection or a detachable connection, may be a mechanical connection or an electrical connection, may be a direct connection, or an indirect connection via an intermediate, or may be internal communication between two elements. For those of ordinary skill in the art, the specific meaning of the above terms in the present disclosure may be construed according to specific circumstances. In the present disclosure, an end close to an operator (for example, a physician) is defined as a proximal end or portion or a distal end or portion, and an end close to a surgical patient is defined as a distal end or portion or a proximal end or portion. Those skilled in the art may understand that the embodiments of the present disclosure may be used for medical instruments or surgical robots or other non-medical apparatuses.

In the present disclosure, the term "position" refers to a location of an object or a part of the object in a three-dimensional space (for example, changes in Cartesian X, Y, and Z coordinates may be used to describe three translational degrees of freedom, for example, three translational degrees of freedom along the Cartesian X-axis, Y-axis, and Z-axis). In the present disclosure, the term "posture" refers to a setting of rotation of an object or a part of the object (for example, three rotational degrees of freedom may be described by roll, pitch, and yaw). In the present disclosure, the term "pose" refers to a combination of a position and a posture of an object or a part of the object and may be described by, for example, six parameters of the six degrees of freedom mentioned above. In the present disclosure, the pose of the handle of the master manipulator may be represented by a joint information set of joints of the master manipulator (for example, by a one-dimensional matrix formed by these pieces of joint information). The pose of the slave tool may be determined from driving information of the slave tool (such as the driving information of the flexible arm body of the slave tool). In the present disclosure, joint information of a joint may include an angle by which the corresponding joint rotates about the corresponding joint axis or a distance by which the corresponding joint moves relative to an initial position of the joint.

Figure 1:
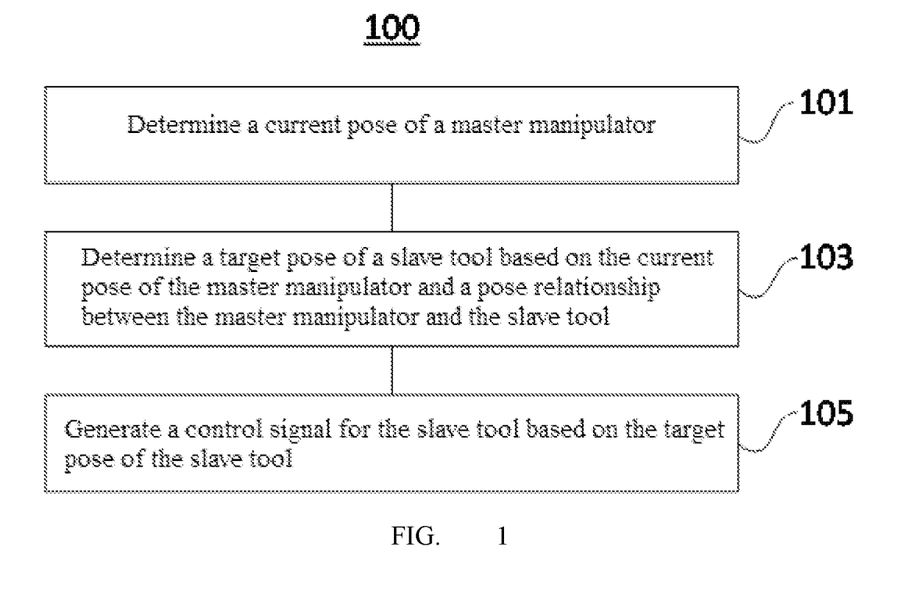
FIG. 1 shows a flowchart of a master-slave motion control method according to some embodiments of the present disclosure.
Figure 2:
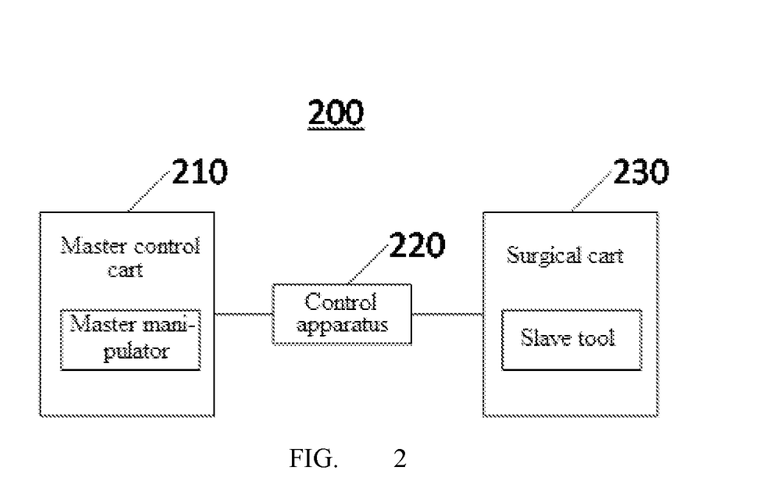
FIG. 2 shows a schematic structural diagram of a robot system according to some embodiments of the present disclosure.

FIG. 1 shows a flowchart of a master-slave motion control method 100 according to some embodiments of the present disclosure, and FIG. 2 shows a schematic structural diagram of a robot system 200 according to some embodiments of the present disclosure. The method 100 may be implemented or performed by hardware, software or firmware. In some embodiments, the method 100 may be performed by a robot system (for example, the robot system 200 shown in FIG. 2). In some embodiments, the method 100 may be implemented as computer-readable instructions. The instructions may be read and executed by a general or special processor (for example, a control apparatus 220 shown in FIG. 2). For example, the control apparatus for the robot system 200 may include a processor configured to perform the method 100. In some embodiments, the instructions may be stored on a computer-readable medium.

In some embodiments, as shown in FIG. 2, the robot system 200 may include a master control cart 210, a surgical cart 230, and a control apparatus 220. The control apparatus 220 may be in communication connection with the master control cart 210 and the surgical cart 230, for example, via a cable or wirelessly, to implement communication between the master control cart 210 and the surgical cart 230. The master control cart 210 includes a master manipulator for teleoperation by an operator, and the surgical cart 230 includes a slave tool for performing a surgery. The control apparatus 220 implements master-slave mapping between the master manipulator of the master control cart and the slave tool of the surgical cart, such that the master manipulator implements motion control over the slave tool. In some embodiments, the surgical cart includes at least one slave tool (such as a surgical tool or a visual tool) arranged on the surgical cart. Moreover, the slave tool is configured to enter an operating area through a sheath, where the sheath may be fixed at a surgical site of a patient (for example an incision or a natural ostium), and the operating area may be an area where a surgery is performed. The slave tool may include an arm body and an end instrument. The arm body of the slave tool may be a flexible arm body, and the end instrument thereof may be arranged at a distal end of the flexible arm body. The end instrument of the surgical tool may include, but is not limited to, a surgical forcep, an electrotome, an electric hook, etc. The end instrument of the visual tool may include, but is not limited to, an imaging apparatus or a lighting apparatus, etc. In some embodiments, the master control cart includes the master manipulator, a display, and pedals. Those skilled in the art may understand that the master control cart 210 and the surgical cart 230 may take other structures or forms, such as a base, a support, or a building.

Figure 3:
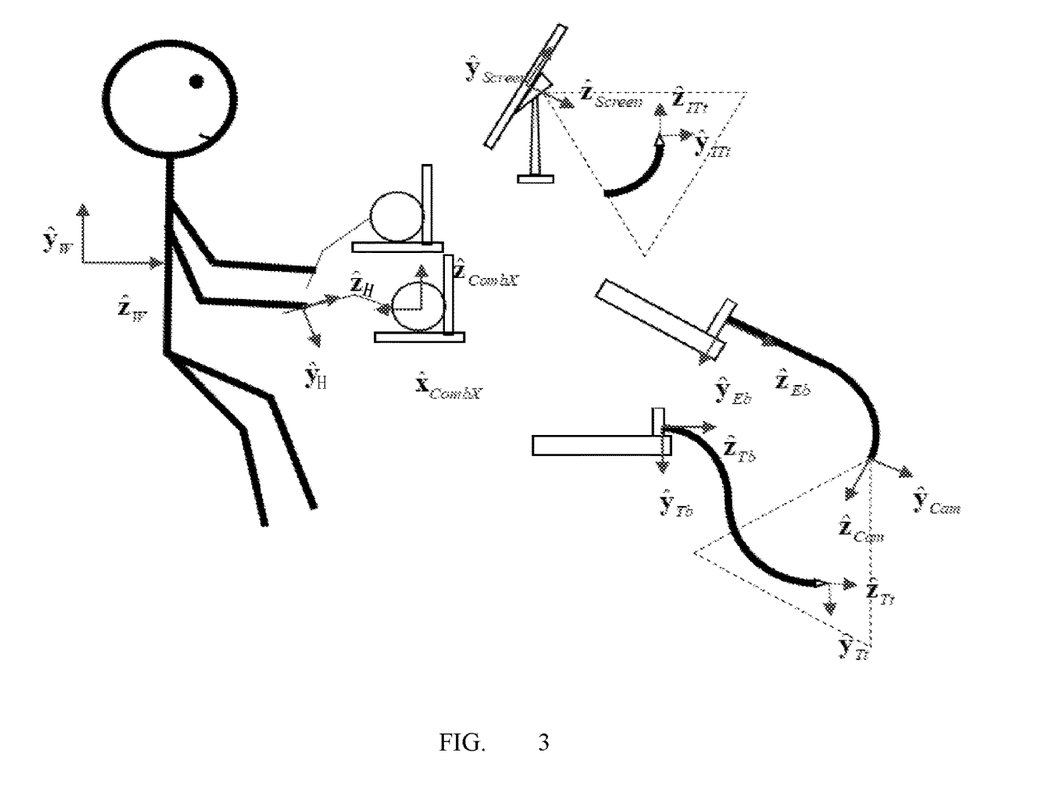
FIG. 3 shows a schematic diagram of coordinate systems in master-slave motion mapping according to some embodiments of the present disclosure.

FIG. 3 shows a schematic diagram of coordinate systems in master-slave motion mapping according to some embodiments of the present disclosure. In FIG. 3, the coordinate systems are defined as follows:

{Eb}: camera base coordinate system, in which an origin is located at a base of the visual tool or an outlet of an abdominal sheath, $\hat{z}_{Eb}$ is consistent with a direction of an extension line of the base or an axial direction of the abdominal sheath, and direction $\hat{y}_{Eb}$ is as shown in FIG. 3.

{Tb}: slave tool base coordinate system, in which an origin is located at a base of the slave tool or an outlet of an abdominal sheath, $\hat{z}_{Tb}$ is consistent with a direction of an extension line of the base or an axial direction of the abdominal sheath, and direction ŷTb is as shown in FIG. 3.

{Cam}: Camera coordinate system, in which an origin is located at the center of a camera, an axial direction of the camera is direction $\hat{z}_{cam}$, and an up direction is $\hat{y}_{cam}$ after a field of view is put straight.

{Tt}: Coordinate system of an end instrument of the slave tool, in which an origin is located at an end of the slave tool, $\hat{z}_{T_t}$ is consistent with an axial direction of the end instrument, and direction $\hat{y}_{T_t}$ is as shown in FIG. 3.

{ITt}: Image coordinate system of the end instrument of the slave tool, which is associated with an image of the end instrument that is displayed in a display.

{W}: Reference coordinate system, which may be a coordinate system of a space in which the master manipulator is located, or a world coordinate system, where the reference coordinate system may be based on motion sensing of the operator, and when the operator sits up in front of a master station, a sensed upward motion represents direction $\hat{y}_W$, and a sensed forward motion represents direction $\hat{z}_W$.

{Screen}: Display coordinate system, in which an origin is located at the center of the display, an inward direction perpendicular to a screen is a positive direction $\hat{z}_{screen}$, and an up direction of the screen is $\hat{y}_{screen}$.

{CombX}: Master manipulator base coordinate system, directions of coordinate axes of which are as shown in FIG. 3.

{H}: Coordinate system of the handle of the master manipulator, directions of coordinate axes of which are as shown in FIG. 3.

Hereinafter, the master-slave motion control method 100 is described by taking the coordinate systems shown in FIG. 3 as an example. However, those skilled in the art may understand that the master-slave motion control method 100 may be implemented using definition of other coordinate systems.

As shown in FIG. 1, in step 101, a current pose of a master manipulator may be determined, the current pose including a current position and a current posture. In some embodiments, the current pose of the master manipulator is a pose relative to a master manipulator base coordinate system. For example, the pose of the master manipulator is a pose of a coordinate system defined by a handle of the master manipulator or a part thereof relative to the master manipulator base coordinate system (for example, a coordinate system defined by the support or base where the master manipulator is located, or a world coordinate system). In some embodiments, determining the current position of the master manipulator includes determining a current position of the handle of the master manipulator relative to the master manipulator base coordinate system, and determining the current posture of the master manipulator includes determining a current posture of the handle of the master manipulator relative to the master manipulator base coordinate system.

In some embodiments, the current pose of the master manipulator may be determined based on coordinate transformation. For example, the current posture of the handle may be determined based on a transformation relationship between the coordinate system of the handle of the master manipulator and the master manipulator base coordinate system. Usually, the master manipulator base coordinate system may be set on the support or base where the master manipulator is located, and during teleoperation, the master manipulator base coordinate system remains unchanged.

In some embodiments, the current pose of the master manipulator may be determined based on a master-manipulator sensor. In some embodiments, current joint information of at least one joint of the master manipulator is received, and the current pose of the master manipulator is determined based on the current joint information of the at least one joint. For example, the current pose of the master manipulator is determined based on current joint information of the at least one joint that is obtained by the master-manipulator sensor. The master-manipulator sensor is arranged at at least one joint of the master manipulator. For example, the master manipulator includes at least one joint, and at least one master-manipulator sensor is arranged at the at least one joint. The current pose of the master manipulator is calculated based on joint information (a position or an angle) of a corresponding joint that is obtained by the master-manipulator sensor. For example, the current position and the current posture of the master manipulator are calculated based on a forward kinematics algorithm.

In some embodiments, the master manipulator includes at least one posture joint for controlling the posture of the handle. Determining the current posture of the handle of the master manipulator includes: obtaining joint information of at least one posture joint, and determining the current posture of the master manipulator based on the joint information of the at least one posture joint. The master manipulator includes a mechanical arm, and the mechanical arm includes a position joint and a posture joint. The posture joint is used to adjust the posture of the master manipulator, and one or more posture joints are used to control the master manipulator to achieve a target posture. The position joint is used to adjust the position of the master manipulator, and one or more position joints are used to control the master manipulator to achieve a target position. The master-manipulator sensor is arranged at each of the posture joint and the position joint of the mechanical arm, and is operable to obtain joint information (a position or an angle) corresponding to the posture joint and the position joint. According to the obtained joint information, the current pose of the handle of the master manipulator relative to the master manipulator base coordinate system may be determined. For example, the master manipulator includes 7 joints, where a joint 5, a joint 6, and a joint 7 are posture joints and are operable to adjust the posture of the handle of the master manipulator. The current posture of the master manipulator is calculated based on the joint information (such as the angle) of the posture joint that is obtained by the master-manipulator sensor, and the forward kinematics algorithm. A joint 1, a joint 2, and a joint 3 are the position joints and are operable to adjust the position of the handle of the master manipulator. The current position of the master manipulator is calculated based on the joint information (such as the position) of the position joint that is obtained by the master-manipulator sensor, and the forward kinematics algorithm.

In step 103, a target pose of a slave tool may be determined based on the current pose of the master manipulator and a pose relationship between the master manipulator and the slave tool. For example, a master-slave mapping relationship between the master manipulator and the slave tool is established, and the pose of the slave tool is controlled by teleoperating the master manipulator. The pose relationship includes a relationship between a pose of the slave tool or an image of the slave tool in a display relative to a reference coordinate system and a pose of the master manipulator relative to the reference coordinate system. The reference coordinate system includes a coordinate system of a space in which the master manipulator is located, or a world coordinate system. In some embodiments, the reference coordinate system may be based on motion sensing of the operator, and therefore the pose of the image of the slave tool in the display relative to the reference coordinate system is considered.

In some embodiments, a pose relationship between the master manipulator and the slave tool may include a relationship between a change amount of the pose of the master manipulator and a change amount of the pose of the slave tool, for example, the former being equivalent or proportional to the latter. Determining the target pose of the slave tool includes: determining a previous pose of the master manipulator, determining a current pose of the slave tool, and then determining the target pose of the slave tool based on the previous pose and the current pose of the master manipulator and the current pose of the slave tool. Each of the previous pose and the current pose of the master manipulator may be a pose of the handle of the master manipulator relative to the master manipulator base coordinate system. Each of the current pose and the target pose of the slave tool may be a pose of the end instrument of the slave tool relative to the slave tool base coordinate system.

The slave tool includes a flexible arm body and an end instrument arranged at an end of the flexible arm body, and the pose of the slave tool includes a posture of the end instrument of the slave tool relative to the slave tool base coordinate system. The slave tool base coordinate system may be a coordinate system of a base mounted on the slave tool (such as an end of a motion arm of a surgical robot), a coordinate system of a sheathing canal through which the slave tool passes (such as a coordinate system of an outlet of the sheathing canal), a coordinate system of a remote center of motion (RCM) of the slave tool, etc. For example, the slave tool base coordinate system may be set at the outlet of the sheathing canal, and during teleoperation, the slave tool base coordinate system remains unchanged. Coordinate system transformation may be performed on a current posture of the end instrument, to obtain a posture thereof relative to other coordinate systems.

In some embodiments, previous joint information of at least one joint of the master manipulator may be received, and the previous pose of the master manipulator may be determined based on the previous joint information of the at least one joint. For example, a previous pose and a current pose of the handle of the master manipulator are determined based on joint information of the master manipulator at a previous time and a current time that is read by the master-manipulator sensor. A change amount of a position of the handle of the master manipulator is determined based on a previous position and the current position of the handle relative to the master manipulator base coordinate system. A change amount of a posture of the handle of the master manipulator is determined based on a previous posture and the current posture of the handle relative to the master manipulator base coordinate system.

In some embodiments, current driving information of at least one driving apparatus of the slave tool may be received, where the at least one driving apparatus is operable to drive the flexible arm body of the slave tool. The current pose of the slave tool is determined based on the current driving information of the at least one driving apparatus. In some embodiments, the current driving information (such as an angle) of the slave tool is obtained by a driving-apparatus sensor, and the current posture of the slave tool is determined based on the current driving information. For example, the current posture of the slave tool can be calculated based on the forward kinematics algorithm.

The driving-apparatus sensor may be arranged on the driving apparatus, and the driving apparatus is operable to drive the flexible arm body of the slave tool. The driving-apparatus sensor is operable to obtain driving information. The current posture of the slave tool may be determined based on the driving information. For example, the driving apparatus may include at least one driving motor, and the driving-apparatus sensor is coupled to the driving motor to record and output motor data. For example, the motor data may include binary or hexadecimal numbers, which can be converted to obtain the current posture of the slave tool. The driving-apparatus sensor may include a potentiometer or an encoder. The potentiometer or encoder can be used to obtain information such as an angle, and then determine the current posture of the slave tool. In some embodiments, the posture of the slave tool may be obtained by using a pose sensor. For example, the pose sensor may also be a fiber sensor, which is arranged on the arm body of the slave tool in a penetrating way and operable to sense the position and posture of the slave tool.

In some embodiments, the change amount of the pose of the master manipulator may be determined based on the previous pose and the current pose of the master manipulator. The change amount of the pose of the slave tool may be determined based on the change amount of the pose of the master manipulator and the pose relationship between the master manipulator and the slave tool. The target pose of the slave tool may be determined based on the current pose of the slave tool and the change amount of the pose of the slave tool.

The pose relationship may include a position relationship and a posture relationship. A position relationship between the master manipulator and the slave tool may include a relationship between a change amount of a position of the master manipulator and a change amount of a position of the slave tool, and a posture relationship between the master manipulator and the slave tool may include a relationship between a change amount of a posture of the master manipulator and a change amount of a posture of the slave tool.

In some embodiments, the method 100 further includes: determining a current position of the handle of the master manipulator relative to the master manipulator base coordinate system; determining a previous position of the handle relative to the master manipulator base coordinate system; determining a current position of the end instrument of the slave tool relative to a slave tool base coordinate system; and determining a target position of the end instrument relative to the slave tool base coordinate system based on the previous position and the current position of the handle relative to the master manipulator base coordinate system, and the current position of the end instrument relative to the slave tool base coordinate system. For example, the previous position of the master manipulator is determined based on corresponding joint information of the master manipulator at a previous time that is read by the master-manipulator sensor, and the current position of the master manipulator is determined based on corresponding joint information of the master manipulator at a current time that is read by the master-manipulator sensor. The change amount of the position of the master manipulator is determined based on the previous position and the current position of the handle relative to the master manipulator base coordinate system. The current position of the slave tool is determined based on joint information of the slave tool at a current time that is read by the slave-tool sensor. The change amount of the position of the slave tool is determined based on the change amount of the position of the master manipulator and the pose relationship between the master manipulator and the slave tool. The target position of the slave tool is determined based on the current position of the slave tool and the change amount of the position of the slave tool.

In some embodiments, the pose relationship includes a relationship between a pose of an image of the slave tool in a display relative to a reference coordinate system and a pose of the master manipulator relative to the reference coordinate system. The slave tool includes a surgical tool and a visual tool. During a surgical operation, the surgical tool is operable to perform a surgery inside a patient's body, and the visual tool is operable to collect images of the patient's body and then transmitting the collected images to the surgical cart. The images are processed by a video processing module in the surgical cart, and then displayed on a display of the master control cart. The operator obtains the pose of the slave tool relative to the reference coordinate system in real time by means of the images on the display. The pose of the master manipulator relative to the reference coordinate system is a posture actually sensed by the operator. There is a preset pose relationship between a change in the pose sensed by the operator when teleoperating the master manipulator and a change in the posture of the slave tool that is sensed by the operator in the display. Thus, by remotely teleoperating the master manipulator, the change in the pose of the master manipulator is converted into the change in the pose of the slave tool based on the preset pose relationship, thereby implementing pose control over the slave tool.

In some embodiments, the pose relationship includes: a change amount of a position of the image of the slave tool in the display relative to the reference coordinate system being proportional to a change amount of a position of the master manipulator relative to the reference coordinate system. Thus, when the operator holds the handle of the master manipulator for operation, based on a principle of an intuitive operation, a change amount of a position of the image of the end instrument of the slave tool that is sensed by the operator keeps a certain proportional relationship with a change amount of a position of the handle of the master manipulator that is sensed by the operator, so as to improve the precision of teleoperation.

The change amount of the position of the image of the slave tool in the display relative to the reference coordinate system is proportional to the change amount of the position of the master manipulator relative to the reference coordinate system, which may be represented as:

$$^{W}\Delta p_{ITt} = k \cdot {}^{W}\Delta p_{H} \quad (1)$$

In formula (1), $^{W}\Delta p_{ITt}$ in the left represents the change amount of the position of the image of the end instrument of the slave tool in the display relative to the reference coordinate system, and $^{W}\Delta p_{H}$ the right represents the change amount of the position of the handle of the master manipulator relative to the reference coordinate system. $^{W}\Delta p_{ITt}$ is proportional to $^{W}\Delta p_{H}$, a proportional coefficient being k.

In some embodiments, the change amount of the position $^{W}\Delta p_{ITt}$ of the slave tool may be determined based on a current position $^{W}p_{ITt(t0)}$ and a target position $^{W}p_{ITt}$ of the image of the slave tool in the display relative to the reference coordinate system. The change amount of the position $^{W}\Delta p_{H}$ of the master manipulator may be determined based on the previous position $^{W}p_{H(t0)}$ and the current position $^{W}p_{H}$ of the master manipulator relative to the reference coordinate system. For example, during triggering of a teleoperation instruction or in the last control cycle, which is represented as being at a moment t0, the previous position $^{W}p_{H(t0)}$ of the handle of the master manipulator relative to the reference coordinate system may be determined based on the joint information of the master manipulator that is obtained by the master-manipulator sensor. In a current control cycle, which is represented as being at a moment t1, the current position $^{W}\Delta p_{H}$ of the handle of the master manipulator relative to the reference coordinate system may be determined based on the joint information of the master manipulator that is obtained by the master-manipulator sensor. The change amount of the position $^{W}\Delta p_{H}$ of the master manipulator is obtained based on the previous position $^{W}p_{H(t0)}$ of the master manipulator at the moment t0 and the current position $^{W}p_{H}$ of the master manipulator at the moment t1. In addition, at the moment t0, the current position $^{W}p_{ITt(t0)}$ of the image of the slave tool in the display may be determined based on driving information of the slave tool. The target position $^{W}p_{ITt}$ of the image of the slave tool in the display may be determined based on the change amount of the position $^{W}\Delta p_{H}$ of the handle and the current position $^{W}p_{ITt(t0)}$ of the image of the slave tool in the display.

In some embodiments, with respect to the left of formula (1), the change amount of the position $^{W}\Delta p_{ITt}$ of the image of the end instrument of the slave tool in the display relative to the reference coordinate system may be determined based on a change amount of a position $^{Screen}\Delta p_{ITt}$ of the image of the slave tool in the display relative to the display coordinate system and a transformation relationship $^{W}R_{Screen}$ between the display coordinate system and the world coordinate system. Specifically, it is expressed in formula (2):

$$^{W}\Delta p_{ITt} = {}^{W}R_{Screen} {}^{Screen}\Delta p_{ITt} \quad (2)$$

In some embodiments, a display coordinate system Screen is consistent with a camera coordinate system Cam in terms of definition of a field-of-view direction. Therefore, the change amount of the position $^{Screen}\Delta p_{ITt}$ of the image of the slave tool in the display relative to the display coordinate system is consistent with a change amount of a position $^{Cam}\Delta p_{Tt}$ of the slave tool relative to the camera coordinate system. Specific reference is made to formula (3):

$$^{Screen}\Delta p_{ITt} = {}^{Cam}\Delta p_{Tt} \quad (3)$$

Formula (4) is obtained based on formulas (2) and (3).

$$^{W}\Delta p_{ITt} = {}^{W}R_{Screen} {}^{Cam}\Delta p_{Tt} \quad (4)$$

In formula (4), the change amount of the position $^{W}\Delta p_{ITt}$ of the image of the slave tool in the display relative to the reference coordinate system may be determined based on the change amount of the position $^{Cam}\Delta p_{Tt}$ of the end instrument of the slave tool relative to the camera coordinate system and the transformation relationship $^{W}R_{Screen}$ between the display coordinate system and the world coordinate system. The display coordinate system has a predetermined transformation relationship $^{W}R_{Screen}$ with the reference coordinate system.

In formula (4), the change amount of the position $^{Cam}\Delta p_{Tt}$ of the end instrument of the slave tool relative to the camera coordinate system may be determined based on Cam a difference between a position $^{Cam}p_{Tt(t0)}$, at the moment to, of the end instrument relative to the camera coordinate system and the position $^{Cam}\Delta p_{Tt}$, at a moment t, of the end instrument relative to the camera coordinate system, which is as shown in formula (5):

$$^{Cam}\Delta p_{Tt} = {}^{Cam}p_{Tt} - {}^{Cam}p_{Tt(t0)} \quad (5)$$

In formulas (4) and (5), the change amount of the position $^{Cam}\Delta p_{Tt}$ of the end instrument of the slave tool in the camera coordinate system may be determined based on a transformation relationship $^{Cam}R_{Rb}$ between the camera base coordinate system and the camera coordinate system, a transformation relationship $^{Eb}R_{Tb}$ between the camera base coordinate system and the slave tool base coordinate system, and a change amount of a position $^{Tb}\Delta p_{Tt}$ of the end instrument of the slave tool relative to the slave tool base coordinate system. Specific reference is made to formula (6):

$$^{Cam}\Delta p_{Tt} = {}^{Cam}R_{Eb} {}^{Eb}R_{Tb} {}^{Tb}\Delta p_{Tt} \quad (6)$$

$^{Tb}\Delta p_{Tt}$ may be determined based on the driving information of the slave tool.

In some embodiments, with respect to the right of formula (1), the change amount of the position $^W\Delta p_H$ of the handle of the master manipulator relative to the reference coordinate system may be determined based on a transformation relationship $^W R_{CombX}$ between the master manipulator base coordinate system and the reference coordinate system and a change amount of a position $^{CombX}\Delta p_H$ of the handle relative to the master manipulator base coordinate system, which is as shown in formula (7):

$$^W\Delta p_H = {^W R_{CombX}} {^{CombX}\Delta p_H} \quad (7)$$

In formula (7), $^W R_{CombX}$ is determined by a placement relationship of the master manipulator. In some embodiments, the reference coordinate system has a predetermined transformation relationship with the master manipulator base coordinate system.

In formula (7), the change amount of the position $^{CombX}\Delta p_H$ of the handle relative to the master manipulator base coordinate system may be determined based on a current posture $^{CombX}p_H$ of the handle of the master manipulator relative to the master manipulator base coordinate system and a previous posture $^{CombX}p_{H(t0)}$ of the handle thereof relative to the master manipulator base coordinate system. Specific reference is made to formula (8):

$$^{CombX}\Delta p_H = {^{CombX}p_H} - {^{CombX}p_{H(t0)}} \quad (8)$$

In combination with formulas (1) to (8), an expression of a target position $^{Tb}p_{Tt}$ of the slave tool during teleoperation may be obtained, which is as shown in formula (9):

$$^{Tb}p_{Tt} = {^{Tb}p_{Tt(t0)}} + k \cdot {^{Tb}R_{Cam}} {^{Screen}R_{CombX}} ({^{CombX}p_H} - {^{CombX}p_{H(t0)}}) \quad (9)$$

based on formula (9), in some embodiments, the target position $^{Tb}p_{Tt}$ of the end instrument relative to the slave tool base coordinate system may be determined based on the previous position $^{CombX}p_{H(t0)}$ and the current position $^{CombX}p_H$ of the handle relative to the master manipulator base coordinate system, a current position $^{Tb}p_{Tt(t0)}$ of the end instrument relative to the slave tool base coordinate system, a transformation relationship $^{Screen}R_{CombX}$ between the master manipulator base coordinate system and the display coordinate system, and a transformation relationship $^{Tb}R_{Cam}$ between the camera coordinate system and the slave tool base coordinate system.

In some embodiments, the transformation relationship $^{Tb}R_{Cam}$ between the camera coordinate system and the slave tool base coordinate system may be determined based on a transformation relationship $^{Eb}R_{Cam}$ between the camera coordinate system and the camera base coordinate system and a transformation relationship $^{Tb}R_{Eb}$ between the camera base coordinate system and the slave tool base coordinate system.

In some embodiments, the transformation relationship $^{Screen}R_{CombX}$ between the master manipulator base coordinate system and the display coordinate system may be determined based on the transformation relationship $^W R_{CombX}$ between the master manipulator base coordinate system and the reference coordinate system and a transformation relationship $^{Screen}R_W$ between the reference coordinate system and the display coordinate system.

In some embodiments, a change amount of a posture of the image of the slave tool in the display relative to the reference coordinate system is consistent with a change amount of a posture of the master manipulator relative to the reference coordinate system. Thus, when the operator holds the handle of the master manipulator for operation, based on a principle of an intuitive operation, a change amount of a posture of the image of the end instrument of the surgical tool that is sensed by the operator keeps consistent with a change amount of a posture of the handle of the master manipulator that is sensed by the operator, so as to improve the precision of teleoperation.

The change amount of the posture $^W R_{ITt(t0)ITt}$ of the image of the slave tool in the display relative to the reference coordinate system is consistent with the change amount of the posture $^W R_{H(t0)H}$ of the master manipulator relative to the reference coordinate system, which may be represented as follows:

$$^W R_{ITt(t0)ITt} = {^W R_{H(t0)H}} \quad (10)$$

In some embodiments, the change amount of the posture $^W R_{H(t0)H}$ of the master manipulator may be determined based on a previous posture $^W R_{H(t0)}$, at the moment t0, and a current posture $^W R_H$, at the moment t1, of the master manipulator relative to the reference coordinate system. Moreover, a target posture $^W R_{ITt}$ of the image of the slave tool in the display may be determined based on the change amount of the posture $^W R_{H(t0)H}$ and a current posture $^W R_{ITt(t0)}$, at the moment t0, of the image of the slave tool in the display relative to the reference coordinate system.

For example, during triggering of a teleoperation instruction or in the last control cycle, which is represented as being at the moment t0, the previous posture $^W R_{H(t0)}$ of the handle of the master manipulator relative to the reference coordinate system may be determined based on the joint information of the master manipulator that is obtained by the master-manipulator sensor. In a current control cycle, which is represented as being at the moment t1, the current posture $^W R_H$ of the handle of the master manipulator relative to the reference coordinate system is determined based on the joint information of the master manipulator that is obtained by the master-manipulator sensor. The change amount of the posture $^W R_{H(t0)H}$ of the master manipulator is obtained based on the previous posture $^W R_{H(t0)}$, at the moment t0, of the master manipulator and the current posture $^W R_H$, at the moment t1, of the master manipulator. In addition, at the moment t0, the current posture $^W R_{ITt(t0)}$ of the image of the slave tool in the display may be determined based on the driving information of the slave tool. The target posture $^W R_{ITt}$ of the image of the slave tool in the display may be determined based on the change amount of the posture $^W R_{H(t0)H}$ of the handle and the current posture $^W R_{ITt(t0)}$ of the image of the slave tool in the display.

In some embodiments, with respect to the left of formula (10), the change amount of the posture $^W R_{ITt(t0)ITt}$ of the image of the slave tool in the display relative to the reference coordinate system may be determined based on the transformation relationship $^W R_{Screen}$ between the reference coordinate system and the display coordinate system, the transformation relationship $^{Screen}R_{Cam}$ between the display coordinate system and the camera coordinate system, a previous pose $^{Cam}R_{Tt(t0)}$ of the end instrument of the slave tool relative to the camera coordinate system, and a current pose $^{Cam}R_{Tt}$ of the end instrument of the slave tool relative to the camera coordinate system. Specific reference is made to formula (11):

$$^W R_{ITt(t0)ITt} = ({^W R_{Screen}} {^{Screen}R_{Cam}} {^{Cam}R_{Tt}})({^W R_{Screen}} {^{Screen}R_{Cam}} {^{Cam}R_{Tt(t0)}})^T \quad (11)$$

In some embodiments, with respect to the right of formula (10), the change amount of the posture $^W R_{H(t0)H}$ of the master manipulator relative to the reference coordinate system may be determined based on the transformation relationship $^W R_{CombX}$ between the reference coordinate system and the master manipulator base coordinate system, the previous posture $^{CombX}R_{H(t0)}$ of the handle of the master manipulator relative to the master manipulator base coordinate system, and the current posture $^{CombX}R_H$ of the handle of the master manipulator relative to the master manipulator base coordinate system. Specific reference is made to formula (12):

$$^{W}R_{H(t0)H} = {}^{W}R_{CombX}{}^{CombX}R_H({}^{W}R_{CombX}{}^{CombX}R_{H(t0)})^T \quad (12)$$

In combination with formulas (10) to (12), the target posture of the slave tool during teleoperation may be obtained, an expression of which is as shown in formula (13):

$$^{Tb}R_{Tt} = {}_{Tb}R_{CombX}({}^{CombX}R_H({}^{CombX}R_{H(t0)})^T){}^{CombX}R_{Tb}{}^{T} \cdot {}_{b}R_{Tt(t0)} \quad (13)$$

Based on formula (13), in some embodiments, a target posture $^{Tb}R_{Tt}$ of the end instrument relative to the slave tool base coordinate system may be determined based on the previous posture $^{CombX}R_{H(t0)}$ and the current posture $^{CombX}R_H$ of the handle relative to the master manipulator base coordinate system, a current posture $^{Tb}R_{Tt(t0)}$ of the end effector of the slave tool relative to the slave tool base coordinate system, and a transformation relationship $^{CombX}R_{Tb}$ between the slave tool base coordinate system and the master manipulator base coordinate system.

In some embodiments, the transformation relationship $^{CombX}R_{Tb}$ between the slave tool base coordinate system and the master manipulator base coordinate system may be determined based on a transformation relationship $^{Cam}R_{Tb}$ between the slave tool base coordinate system and the camera coordinate system, a transformation relationship $^{Screen}R_{Cam}$ between the camera coordinate system and the display coordinate system, and a transformation relationship $^{CombX}R_{Screen}$ between the display coordinate system and the master manipulator base coordinate system.

In some embodiments, the transformation relationship $_{Cam}R_{Tb}$ between the slave tool base coordinate system and the camera coordinate system may be determined based on the transformation relationship $^{Eb}R_{Tb}$ between the slave tool base coordinate system and a camera base coordinate system and the transformation relationship $^{Cam}R_{Eb}$ between the camera coordinate system and the camera base coordinate system. The transformation relationship $^{CombX}R_{Screen}$ between the display coordinate system and the master manipulator base coordinate system may be determined based on the transformation relationship $^{W}R_{Screen}$ between the display coordinate system and the reference coordinate system and the transformation relationship $^{CombX}R_W$ between the reference coordinate system and the master manipulator base coordinate system.

In some embodiments, a camera may be arranged at an end of a flexible arm body that can be driven, and the transformation relationship between the camera coordinate system and the camera base coordinate system is determined based on driving information of the flexible arm body.

In some embodiments, the slave tool base coordinate system has a predetermined transformation relationship with the camera base coordinate system. In some embodiments, before entering a master-slave motion control stage, the visual tool has ended in motion, and a representation $^{Eb}R_{E_t}$ of the current posture of the camera in the camera base coordinate system is not changed any more.

In some embodiments, the display coordinate system has a predetermined transformation relationship with the reference coordinate system. In some embodiments, the reference coordinate system has a predetermined transformation relationship with the master manipulator base coordinate system. In some embodiments, the display coordinate system has a predetermined transformation relationship with the master manipulator base coordinate system.

In some embodiments, the change amount of the posture of the slave tool relative to the reference coordinate system is consistent with the change amount of the posture of the master manipulator relative to the reference coordinate system. In some embodiments, the change amount of the position of the slave tool relative to the reference coordinate system is proportional to the change amount of the position of the master manipulator relative to the reference coordinate system. Thus, when the operator holds and moves the handle of the master manipulator for operating the slave tool, based on a principle of an intuitive operation, a change amount of a position of the end instrument of the slave tool that is sensed by the operator keeps a certain proportional relationship with a change amount of a position of the master manipulator that is sensed by the operator, so as to improve the precision of teleoperation.

The change amount of the position of the slave tool relative to the reference coordinate system is proportional to the change amount of the position of the master manipulator relative to the reference coordinate system, which may be represented as:

$$^{W}\Delta p_{Tt} = k \cdot {}^{W}\Delta p_H \quad (14)$$

In formula (14), $^{W}\Delta p_{Tt}$ in the left represents the change amount of the position of the slave tool relative to the reference coordinate system, and $^{W}\Delta p_H$ in the right represents the change amount of the position of the master manipulator relative to the reference coordinate system. In addition, $^{W}\Delta p_{Tt}$ is proportional to $^{W}\Delta p_H$, a proportional coefficient being k.

In some embodiments, the change amount of the position $^{W}\Delta p_{Tt}$ of the slave tool may be determined based on the previous position $^{W}p_{Tt(t0)}$ and the current position $^{W}p_{Tt}$ of the slave tool relative to the reference coordinate system. The change amount of the position $^{W}\Delta p_H$ of the master manipulator may be determined based on the previous position $^{W}p_{H(t0)}$ and the current position $^{W}p_H$ of the master manipulator relative to the reference coordinate system. For example, during triggering of a teleoperation instruction or in the last control cycle, which is represented as being at a moment t0, the previous position $^{W}p_{H(t0)}$ of the handle of the master manipulator relative to the reference coordinate system may be determined based on the joint information of the master manipulator that is obtained by the master-manipulator sensor. In a current control cycle, which is represented as being at a moment t1, the current position $^{W}p_H$ of the handle of the master manipulator relative to the reference coordinate system is determined based on the joint information of the master manipulator that is obtained by the master-manipulator sensor. The change amount of the position $^{W}\Delta p_H$ of the master manipulator is obtained based on the previous position $^{W}p_{H(t0)}$ of the master manipulator at the moment t0 and the current position $^{W}p_H$ of the master manipulator at the moment t1. In addition, at the moment t0, the current position of the slave tool relative to the reference coordinate system may be determined based on the driving information of the slave tool. The target position $^{W}p_{Tt}$ of the slave tool relative to the reference coordinate system may be determined based on the change amount of the position $^{W}\Delta p_H$ of the handle and the current position $^{W}p_{Tt(t0)}$ of the slave tool relative to the reference coordinate system.

In formula (14), the change amount of the position $^{W}\Delta p_{Tt}$ of the end instrument of the slave tool relative to the reference coordinate system may be represented by a difference between the position $^{W}p_{Tt}$, at the moment t0, of the end instrument relative to the reference coordinate system and the position $^{W}p_{Tt(t0)}$, at the moment t, of the end instrument relative to the reference coordinate system, which is as shown in formula (15):

$$^{W}\Delta p_{Tt} = {}^{W}p_{Tt} - {}^{W}p_{Tt(t0)} \qquad (15)$$

In formula (14), the change amount of the position $^{W}\Delta p_{H}$ of the master manipulator relative to the world coordinate system may be represented by a difference between the position $^{W}p_{H(t0)}$, at the moment t0, of the master manipulator relative to the reference coordinate system and the position $^{W}p_{H}$, at the moment t, of the master manipulator relative to the reference coordinate system, which is as shown in formula (16):

$$^{W}\Delta p_{H} = {}^{W}p_{H} - {}^{W}p_{H(t0)} \qquad (16)$$

In some embodiments, the left and right of formula (14) are respectively multiplied by the same matrix, and formula (17) is obtained based on formulas (14) to (16).

$$^{Tb}R_{W}({}^{W}p_{Tt} - {}^{W}p_{Tt(t0)}) = k \cdot {}^{Tb}R_{W}({}^{W}p_{H} - {}^{W}p_{H(t0)}) \qquad (17)$$

Formula (18) is obtained based on the left of formula (17).

$$^{Tb}R_{W}({}^{W}p_{Tt} - {}^{W}p_{Tt(t0)}) = {}^{Tb}p_{Tt(t0)} \qquad (18)$$

Formula (19) is obtained based on the right of formula (17).

$$k \cdot {}^{Tb}R_{W}({}^{W}p_{H} - {}^{W}p_{H(t0)}) = k \cdot {}^{Tb}R_{CombX}({}^{CombX}p_{H} - {}^{CombX}p_{H(t0)}) \qquad (19)$$

Formula (20) is obtained based on formulas (18) and (19).

$$^{Tb}p_{Tt} = k \cdot {}^{Tb}R_{CombX}({}^{CombX}p_{H} - {}^{CombX}p_{H(t0)}) + {}^{tb}p_{Tt(t0)} \qquad (20)$$

Based on formula (20), in some embodiments, the target position $^{Tb}p_{Tt}$ of the end instrument relative to the slave tool base coordinate system may be determined based on the previous position $^{CombX}p_{H(t0)}$ and the current position $^{CombX}p_{H}$ of the handle relative to the master manipulator base coordinate system, the current position $^{Tb}p_{Tt(t0)}$ of the end instrument relative to the slave tool base coordinate system, and the transformation relationship $^{Tb}p_{CombX}$ between the master manipulator base coordinate system and the slave tool base coordinate system.

In some embodiments, the change amount of the posture of the slave tool relative to the reference coordinate system is consistent with the change amount of the posture of the master manipulator relative to the reference coordinate system. Thus, when the operator holds and moves the handle of the master manipulator for operating the slave tool, based on a principle of an intuitive operation, a change amount of a posture of the end instrument of the surgical tool that is sensed by the operator keeps consistent with a change amount of a posture of the master manipulator that is sensed by the operator, so as to improve the precision of teleoperation.

The change amount of the posture of the slave tool relative to the reference coordinate system is consistent with the change amount of the posture of the master manipulator relative to the reference coordinate system, which may be represented as:

$$^{W}R_{T_{t}(t0)T_{t}} = {}^{W}R_{H(t0)H} \qquad (21)$$

In formula (21), $^{W}R_{T_{t}(0)T_{t}}$ in the left represents the change amount of the posture of the slave tool relative to the reference coordinate system, and $^{W}R_{H(t0)H}$ in the right represents the change amount of the posture of the master manipulator relative to the reference coordinate system.

In some embodiments, a change amount of a posture $^{W}R_{T_{t}(t0)T_{t}}$ of the slave tool may be determined based on the current posture $^{W}R_{T_{t}(t0)}$ and the target posture $^{W}R_{T_{t}}$ of the slave tool relative to the reference coordinate system. The change amount of the posture of the master manipulator is determined based on the previous posture $^{W}R_{H(t0)}$ and the current posture $^{W}R_{H}$ of the master manipulator relative to the reference coordinate system. For example, during triggering of a teleoperation instruction or in the last control cycle, which is represented as being at the moment t0, the previous posture $^{W}R_{H(t0)H}$ of the handle of the master manipulator relative to the reference coordinate system may be determined based on the joint information of the master manipulator that is obtained by the master-manipulator sensor. In a current control cycle, which is represented as being at the moment t1, the current posture $^{W}R_{H}$ of the handle of the master manipulator relative to the reference coordinate system is determined based on the joint information of the master manipulator that is obtained by the master-manipulator sensor. The change amount of the posture $^{W}\Delta p_{H}$ of the master manipulator may be obtained based on the previous posture $^{W}R_{H(t0)H}$, at the moment t0, of the master manipulator and the current posture $^{W}R_{H}$, at the moment t1, of the master manipulator. In addition, at the moment t0, the current posture $^{W}R_{T_{t}(t0)}$ of the slave tool relative to the reference coordinate system may be determined based on the driving information of the slave tool. A target posture $^{W}R_{T_{t}}$ of the slave tool relative to the reference coordinate system may be determined based on the change amount of the posture $^{W}R_{H(t0)H}$ of the handle and the current posture $^{W}R_{T_{t}(t0)}$ of the slave tool relative to the reference coordinate system.

In formula (21), the change amount of the posture $^{W}R_{T_{t}(t0)T_{t}}$ of the slave tool relative to the reference coordinate system may be determined based on the current posture $^{W}R_{T_{t}(t0)}$, at the moment t0, of the end instrument relative to the reference coordinate system and the target posture $^{W}R_{T_{t}}$, at a moment t, of the end instrument relative to the reference coordinate system. The change amount of the posture $^{W}R_{H(t0)H}$ of the master manipulator relative to the reference coordinate system may be determined based on the previous posture $^{W}R_{H(t0)}$, at the moment t0, of the handle relative to the reference coordinate system and the current posture $^{W}R_{H}$, at the moment t, of the handle relative to the reference coordinate system. Specific reference is made to formula (22):

$$^{W}R_{T_{t}}({}^{W}R_{T_{t}(t0)})^{T} = {}^{W}R_{H}({}^{W}R_{H(t0)})^{T} \qquad (22)$$

In some embodiments, the left and right of formula (22) are respectively multiplied by the same matrix $^{Tb}R_{W}({}^{Tb}R_{R})^{T}$, and formula (23) is obtained based on formula (22).

$$^{Tb}R_{W}{}^{W}R_{T_{t}}({}^{W}R_{T_{t}(t0)})^{T}({}^{Tb}R_{W})^{T} = {}^{Tb}R_{W}{}^{W}R_{H}({}^{W}R_{H(t0)})^{T} \\ ({}^{Tb}R_{W}{}^{T}) \qquad (23)$$

Formula (24) is obtained based on the left of formula (23).

$$^{Tb}R_{W}{}^{W}R_{T_{t}}({}^{W}R_{T_{t}(t0)})^{T}({}^{Tb}R_{W})^{T} = ({}^{Tb}R_{W}{}^{W}R_{T_{t}}) \\ ({}^{Tb}R_{W}{}^{W}R_{T_{t}(t0)})^{T} = {}^{Tb}R_{T_{t}}({}^{Tb}R_{T_{t}(t0)})^{T} \qquad (24)$$

Formula (25) is obtained based on the right of formula (23).

$$^{Tb}R_{W}{}^{W}R_{H}({}^{W}R_{H(t0)})^{T}({}^{Tb}R_{W})^{T} = {}^{Tb}R_{H}{}^{Tb}R_{H(t0)})^{T} = \\ ({}^{Tb}R_{Cmbx}{}^{CombX}R_{H})({}^{Tb}R_{CombX}{}^{CombX}R_{H(t0)})^{T} \qquad (25)$$

In combination with formulas (21) to (25), the target posture of the slave tool during teleoperation may be obtained, an expression of which is as shown in formula (26):

$$^{Tb}R_{Tt'} = {}^{Tb}R_{CombX}({}^{CombX}R_H({}^{CombX}R_{H(t0)})^T){}^{CombX}R_{Tb}{}^{Tb}R_{Tt(t0)} \quad (26)$$

Based on formula (26), in some embodiments, the target posture $^{Tb}R_{Tt'}$ of the end instrument relative to the slave tool base coordinate system may be determined based on the previous posture $^{CombX}R_{H(t0)}$ and the current posture $^{CombX}R_H$ of the handle relative to the master manipulator base coordinate system, the current posture $^{Tb}R_{Tt(t0)}$ of the end effector of the slave tool relative to the slave tool base coordinate system, and the transformation relationship $^{CombX}R_{Tb}$ between the slave tool base coordinate system and the master manipulator base coordinate system.

In step 105, a control signal for the slave tool may be generated based on the target pose of the slave tool. In some embodiments, a driving signal for driving at least one driving apparatus of the slave tool is generated based on the target pose of the slave tool. In some embodiments, a driving signal for driving at least one driving apparatus of the slave tool is generated based on the current pose and the target pose of the slave tool. For example, the driving signal for driving the at least one driving apparatus of the slave tool is calculated based on an inverse kinematics algorithm.

In some embodiments, the master-slave motion control method further includes: implementing master-slave motion control in a predetermined cycle. For example, during master-slave motion control, the current posture of the master manipulator is read in the predetermined cycle, the target pose of the slave tool is determined based on the current pose of the master manipulator and the pose relationship between the master manipulator and the slave tool, and the slave tool is controlled to move to the target pose, to implement motion control of the slave tool by the master manipulator.

In some embodiments, for each current cycle, the previous pose of the master manipulator includes a pose of the master manipulator when establishing the master-slave mapping relationship with the slave tool for the first time or a pose in the last cycle. The current pose of the master manipulator includes a pose of the master manipulator in a current cycle (for example, a pose formed after teleoperation). The current pose of the slave tool includes a pose in the current cycle (for example, a pose before the master-slave control is performed in the current cycle), and the target pose includes a target pose of when the master-slave control is performed in the current cycle. The current pose of the master manipulator matches the target pose of the slave tool.

A surgical robot requires an extremely high operation precision and human-machine interaction experience. The surgical robot usually performs a surgical operation via a visual system. In the visual system, the pose of the camera is usually adjustable in order to adjust the angle and extent of a field of view. However, an adjustment to the pose of the camera may cause a change in the observation experience of the operator (such as the surgeon). In some embodiments of the present disclosure, the positions and postures of the camera and the display are considered, and the usage experience of the operator is optimized, such that the slave tool can be accurately and rapidly controlled to move to an expected position, and the motion limit of the master manipulator can be broken through, achieving a larger operating range. Therefore, some embodiments of the present disclosure can alleviate or even avoid a visual and practical difference caused by direct mapping between the pose of the master manipulator and the pose of the slave tool, and a limited motion extent of the slave tool due to a limited pose of the master manipulator controlling the slave tool.

Figure 4:
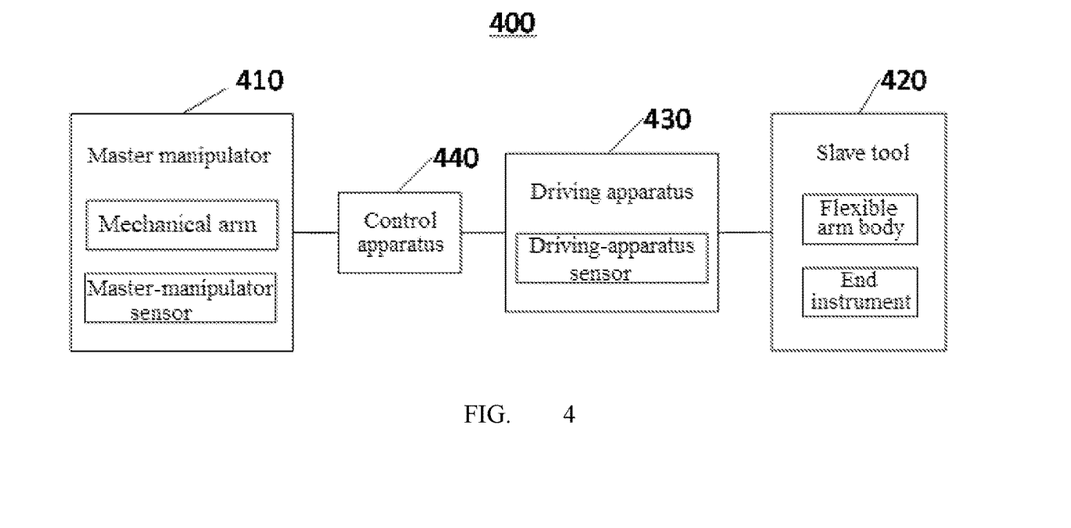
FIG. 4 shows a schematic diagram of a robot system according to some embodiments of the present disclosure.

FIG. 4 shows a schematic diagram of a robot system 400 according to some embodiments of the present disclosure. As shown in FIG. 4, the robot system 400 includes: a master manipulator 410, a slave tool 420, a driving apparatus 430, and a control apparatus 440. The master manipulator 410 includes a mechanical arm, a handle arranged on the mechanical arm, and at least one master-manipulator sensor arranged at at least one joint of the mechanical arm, where the at least one master-manipulator sensor is operable to obtain joint information of the at least one joint. The slave tool 420 includes a flexible arm body and an end instrument. The driving apparatus 430 is operable to drive the flexible arm body of the slave tool. At least one driving-apparatus sensor is coupled to the at least one driving apparatus and is operable to obtain driving information. The control apparatus 440 is in communication connection with the master manipulator 410 and the at least one driving apparatus 430. The control apparatus 440 is configured to perform the master-slave motion control method according to some embodiments of the present disclosure.

In some embodiments, the master manipulator 410 includes a six-degree-of-freedom mechanical arm. One master-manipulator sensor is arranged at each joint of the six-degree-of-freedom mechanical arm, and the master-manipulator sensor at each joint generates joint information (such as joint angle data). In some embodiments, the master-manipulator sensor is a potentiometer and/or an encoder.

In some embodiments, the slave tool 420 includes a multi-joint six-degree-of-freedom flexible arm body.

In some embodiments, the driving apparatus 430 is operable to drive the flexible arm body of the slave tool 420, and obtains driving information corresponding to the slave tool through the driving-apparatus sensor.

In some embodiments, the control apparatus 440 is in communication connection with the master manipulator 410 and the driving apparatus 430. For example, the master manipulator 410, the driving apparatus 430, and the control apparatus 440 may be connected through a data transmission bus, including, but not limited to, by means of wireless data transmission, a wired data connection, or a combination of multiple data communication modes. The data transmission bus may be a communication protocol bus, for example, a controller area network (CAN) bus.

The control apparatus 440 is configured to perform the master-slave motion control method in some embodiments of the present disclosure. For example, the control apparatus receives a network data packet (such as joint information) sent by the master-manipulator sensor and the driving-apparatus sensor. The control apparatus calculates, based on the joint information of the slave tool and the joint information of the master manipulator, a joint target value at which the handle of the master manipulator reaches the target posture that is consistent with the current posture of the slave tool, and converts the joint target value into a driving signal and sends same to the driving apparatus 430. The driving apparatus 430 receives the driving signal via a network data packet, and sends the driving signal to each Epos control tool via a CAN bus, to drive the motion of each motor of the master manipulator, such that the master manipulator moves to a required position, thereby implementing matching between postures of the handle of the master manipulator and the slave tool.

In some embodiments, the master manipulator may be provided with a controller. The controller may calculate posture data of the master manipulator based on joint information obtained by each master-manipulator sensor, and send the calculated posture data to the control apparatus. In some other embodiments, the control apparatus may also obtain, through calculation, the posture data of the master manipulator based on joint data sent by the master-manipulator sensor.

Item 1. A master-slave motion control method, including:
determining a current pose of a master manipulator, the current pose including a current position and a current posture;
determining a target pose of a slave tool based on the current pose of the master manipulator and a pose relationship between the master manipulator and the slave tool; and generating a control signal for the slave tool based on the target pose of the slave tool.

Item 2. The control method according to item 1, where the pose relationship includes a relationship between a pose of the slave tool or an image of the slave tool in a display relative to a reference coordinate system and a pose of the master manipulator relative to the reference coordinate system.

Item 3. The control method according to item 1 or item 2, where the pose relationship includes at least one of the following:
a change amount of a position of the slave tool or the image of the slave tool in the display relative to the reference coordinate system being proportional to a change amount of a position of the master manipulator relative to the reference coordinate system; or
a change amount of a posture of the slave tool or the image of the slave tool in the display relative to the reference coordinate system being consistent with a change amount of a posture of the master manipulator relative to the reference coordinate system.

Item 4. The control method according to item 2 or item 3, where the reference coordinate system includes a coordinate system of a space in which the master manipulator is located, or a world coordinate system.

Item 5. The control method according to any one of items 1 to 4, further including:
determining a previous pose of the master manipulator;
determining a current pose of the slave tool;
determining the target pose of the slave tool based on the previous pose and the current pose of the master manipulator and the current pose of the slave tool.

Item 6. The control method according to any one of items 1 to 5, further including:
determining a current position of a handle of the master manipulator relative to a master manipulator base coordinate system;
determining a previous position of the handle relative to the master manipulator base coordinate system;
determining a current position of an end instrument of the slave tool relative to a slave tool base coordinate system; and
determining a target position of the end instrument relative to the slave tool base coordinate system based on the previous position and the current position of the handle relative to the master manipulator base coordinate system, and the current position of the end instrument relative to the slave tool base coordinate system.

Item 7. The control method according to item 6, where the determining a target position of the end instrument relative to the slave tool base coordinate system includes:
determining the target position of the end instrument relative to the slave tool base coordinate system based on the previous position and the current position of the handle relative to the master manipulator base coordinate system, a transformation relationship between the master manipulator base coordinate system and a display coordinate system, a transformation relationship between a camera coordinate system and the slave tool base coordinate system, and the current position of the end instrument relative to the slave tool base coordinate system.

Item 8. The control method according to item 7, where the display coordinate system is consistent with the camera coordinate system in terms of definition of a field-of-view direction.

Item 9. The control method according to any one of items 6 to 8, where the determining a target position of the end instrument relative to the slave tool base coordinate system includes:
determining the target position of the end instrument relative to the slave tool base coordinate system based on the previous position and the current position of the handle relative to the master manipulator base coordinate system, a transformation relationship between the master manipulator base coordinate system and the slave tool base coordinate system, and the current position of the end instrument relative to the slave tool base coordinate system.

Item 10. The control method according to any one of items 1 to 9, further including:
determining a current posture of the handle of the master manipulator relative to the master manipulator base coordinate system;
determining a previous posture of the handle relative to the master manipulator base coordinate system;
determining a current posture of the end instrument of the slave tool relative to the slave tool base coordinate system; and
determining a target posture of the end instrument relative to the slave tool base coordinate system based on the previous posture and the current posture of the handle relative to the master manipulator base coordinate system, a transformation relationship between the slave tool base coordinate system and the master manipulator base coordinate system, and the current posture of the end effector of the slave tool relative to the slave tool base coordinate system.

Item 11. The control method according to item 10, where the transformation relationship between the slave tool base coordinate system and the master manipulator base coordinate system is determined based on a transformation relationship between the slave tool base coordinate system and the camera coordinate system, a transformation relationship between the camera coordinate system and the display coordinate system, and a transformation relationship between the display coordinate system and the master manipulator base coordinate system.

Item 12. The control method according to item 7 or item 11, where the transformation relationship between the slave tool base coordinate system and the camera coordinate system is determined based on a transformation relationship between the slave tool base coordinate system and a camera base coordinate system and a transformation relationship between the camera coordinate system and the camera base coordinate system.

Item 13. The control method according to item 7 or item 11, where the transformation relationship between the display coordinate system and the master manipulator base coordinate system is determined based on a transformation relationship between the display coordinate system and the reference coordinate system and a transformation relationship between the reference coordinate system and the master manipulator base coordinate system.

Item 14. The control method according to item 12 or item 13, where the slave tool base coordinate system has a predetermined transformation relationship with the camera base coordinate system.

Item 15. The control method according to item 13 or item 14, where the display coordinate system has a predetermined transformation relationship with the reference coordinate system.

Item 16. The control method according to any one of items 13 to 15, where the reference coordinate system has a predetermined transformation relationship with the master manipulator base coordinate system.

Item 17. The control method according to any one of items 12 to 16, where a camera is arranged at an end of a flexible arm body that can be driven, and the transformation relationship between the camera coordinate system and the camera base coordinate system is determined based on driving information of the flexible arm body.

Item 18. The control method according to any one of items 1 to 17, further including:
receiving current joint information of at least one joint of the master manipulator; and determining the current pose of the master manipulator based on the joint information of the at least one joint.

Item 19. The control method according to any one of items 1 to 18, where the generating a control signal for the slave tool includes: generating a driving signal for driving at least one driving apparatus of the slave tool based on the target pose of the slave tool.

Item 20. The control method according to any one of items 5 to 19, further including:
receiving previous joint information of at least one joint of the master manipulator; determining the previous pose of the master manipulator based on the previous joint information of the at least one joint, the previous pose including a previous position and a previous posture;
receiving current driving information of at least one driving apparatus of the slave tool, where the at least one driving apparatus is operable to drive a flexible arm body of the slave tool; and
determining the current pose of the slave tool based on the current driving information of the at least one driving apparatus, the current pose including a current position and a current posture.

Item 21. The control method according to any one of items 1 to 20, further including: implementing master-slave motion control in a predetermined cycle.

Item 22. A robot system, including:
a master manipulator, which includes a mechanical arm, a handle arranged on the mechanical arm, and at least one master-manipulator sensor arranged at at least one joint of the mechanical arm, where the at least one master-manipulator sensor is operable to obtain joint information of the at least one joint;
a slave tool, which includes a flexible arm body and an end instrument;
at least one driving apparatus operable to drive the flexible arm body of the slave tool;
at least one driving-apparatus sensor coupled to the at least one driving apparatus and operable to obtain driving information; and
a control apparatus in communication connection with the master manipulator and the at least one driving apparatus, where the control apparatus is configured to perform the master-slave motion control method according to any one of items 1 to 21.

Item 23. A computer device, including:
a memory for storing at least one instruction; and
a processor coupled to the memory and configured to execute the at least one instruction to perform the master-slave motion control method according to any one of items 1 to 21.

Item 24. A computer-readable storage medium for storing at least one instruction that, when executed by a computer, causes a robot system to implement the master-slave motion control method according to any one of items 1 to 21.

It should be noted that the foregoing descriptions are merely exemplary embodiments of the present disclosure and technical principles applied thereto. Those skilled in the art can understand that the present disclosure is not limited to the specific embodiments herein, and various obvious modifications, changes and substitutions can be made by those skilled in the art without departing from the protection scope of the present disclosure. Therefore, although the present disclosure is described in detail by the foregoing embodiments, the present disclosure is not limited to the foregoing embodiments. More other equivalent embodiments may also be included without departing from the concept of the present disclosure, and the scope of the present disclosure depends on the scope of the appended claims.

The invention claimed is:

1. A master-slave motion control method, comprising:
generating a first driving signal to drive a motion of a motor of a master manipulator such that the master manipulator is controlled to move to a target posture that is consistent with a current posture of a visual tool;
implementing a motion control between the master manipulator and the visual tool to adjust a field of view of a camera of the visual tool;
generating a second driving signal to drive a motion of the motor of the master manipulator such that the master manipulator is controlled to move to a target posture that is consistent with a current posture of an image of a surgical tool in a display; and
implementing a master-slave motion control between the master manipulator and the surgical tool through a plurality of control cycles,
wherein the method further comprises: in each control cycle,
determining a current pose of the master manipulator, the current pose comprising a current position and a current posture;
determining a target pose of the surgical tool based on the current pose of the master manipulator and a pose relationship between the master manipulator and the surgical tool; and
generating a control signal for controlling a motion of the surgical tool based on the target pose of the surgical tool.

2. The control method according to claim 1, wherein the pose relationship comprises a relationship between a pose of the image of the surgical tool in the display relative to a reference coordinate system and a pose of the master manipulator relative to the reference coordinate system.

3. The control method according to claim 2, wherein the pose relationship comprises at least one of the following:
a change amount of a position of the image of the surgical tool in the display relative to the reference coordinate system being proportional to a change amount of a position of the master manipulator relative to the reference coordinate system; or
a change amount of a posture of the image of the surgical tool in the display relative to the reference coordinate system being consistent with a change amount of a posture of the master manipulator relative to the reference coordinate system.

4. The control method according to claim 1, further comprising:
determining a current position of a handle of the master manipulator relative to a master manipulator base coordinate system;
determining a previous position of the handle relative to the master manipulator base coordinate system;
determining a current position of an end instrument of the surgical tool relative to a surgical tool base coordinate system; and
determining a target position of the end instrument relative to the surgical tool base coordinate system based on the previous position and the current position of the handle relative to the master manipulator base coordinate system, and the current position of the end instrument relative to the surgical tool base coordinate system.

5. The control method according to claim 4, wherein determining the target position of the end instrument relative to the surgical tool base coordinate system comprises:
determining the target position of the end instrument relative to the surgical tool base coordinate system based on the previous position and the current position of the handle relative to the master manipulator base coordinate system, a transformation relationship between the master manipulator base coordinate system and a display coordinate system, a transformation relationship between a camera coordinate system and the surgical tool base coordinate system, and the current position of the end instrument relative to the surgical tool base coordinate system.

6. The control method according to claim 5, wherein the transformation relationship between the surgical tool base coordinate system and the camera coordinate system is determined based on a transformation relationship between the surgical tool base coordinate system and a camera base coordinate system and a transformation relationship between the camera coordinate system and the camera base coordinate system.

7. The control method according to claim 5, wherein the display coordinate system is consistent with the camera coordinate system in terms of definition of a field-of-view direction.

8. The control method according to claim 4, wherein determining the target position of the end instrument relative to the surgical tool base coordinate system comprises:
determining the target position of the end instrument relative to the surgical tool base coordinate system based on the previous position and the current position of the handle relative to the master manipulator base coordinate system, a transformation relationship between the master manipulator base coordinate system and the surgical tool base coordinate system, and the current position of the end instrument relative to the surgical tool base coordinate system.

9. The control method according to claim 1, further comprising:
determining a current posture of a handle of the master manipulator relative to a master manipulator base coordinate system;
determining a previous posture of the handle relative to the master manipulator base coordinate system;
determining a current posture of an end instrument of the surgical tool relative to a surgical tool base coordinate system; and
determining a target posture of the end instrument relative to the surgical tool base coordinate system based on the previous posture and the current posture of the handle relative to the master manipulator base coordinate system, a transformation relationship between the surgical tool base coordinate system and the master manipulator base coordinate system, and the current posture of the end instrument of the surgical tool relative to the surgical tool base coordinate system.

10. The control method according to claim 9, wherein the transformation relationship between the surgical tool base coordinate system and the master manipulator base coordinate system is determined based on a transformation relationship between the surgical tool base coordinate system and a camera coordinate system, a transformation relationship between the camera coordinate system and the display coordinate system, and a transformation relationship between the display coordinate system and the master manipulator base coordinate system.

11. The control method according to claim 10, wherein the transformation relationship between the surgical tool base coordinate system and the camera coordinate system is determined based on a transformation relationship between the surgical tool base coordinate system and a camera base coordinate system and a transformation relationship between the camera coordinate system and the camera base coordinate system.

12. The control method according to claim 11, wherein the surgical tool base coordinate system has a predetermined transformation relationship with the camera base coordinate system.

13. The control method according to claim 11, wherein a camera is arranged at an end of a flexible arm body that can be driven, and the transformation relationship between the camera coordinate system and the camera base coordinate system is determined based on driving information of the flexible arm body.

14. The control method according to claim 1, further comprising:
receiving current joint information of at least one joint of the master manipulator; and
determining the current pose of the master manipulator based on the joint information of the at least one joint.

15. The control method according to claim 1, wherein generating the control signal for the surgical tool comprises:
generating a driving signal for driving at least one driving apparatus of the surgical tool based on the target pose of the surgical tool.

16. The control method according to claim 5, further comprising:
receiving previous joint information of at least one joint of the master manipulator;

determining the previous pose of the master manipulator based on the previous joint information of the at least one joint, the previous pose comprising a previous position and a previous posture;

receiving current driving information of at least one driving apparatus of the surgical tool, wherein the at least one driving apparatus is operable to drive a flexible arm body of the surgical tool; and determining the current pose of the surgical tool based on the current driving information of the at least one driving apparatus, the current pose comprising a current position and a current posture.

17. A robot system, comprising:

a master manipulator, which comprises a mechanical arm, a handle arranged on the mechanical arm, and at least one master-manipulator sensor arranged in at least one joint of the mechanical arm, wherein the at least one master-manipulator sensor is operable to obtain joint information of the at least one joint;

at least one master manipulator driving apparatus operable to drive the master manipulator;

a surgical tool, which comprises a flexible arm body and an end instrument;

at least one surgical tool driving apparatus operable to drive the flexible arm body of the surgical tool;

at least one surgical tool driving-apparatus sensor coupled to the at least one surgical tool driving apparatus and operable to obtain driving information of the at least one surgical tool driving apparatus;

a visual tool, which comprises a flexible arm body and a camera;

at least one visual tool driving apparatus operable to drive the flexible arm body of the visual tool;

at least one visual tool driving-apparatus sensor coupled to the at least one visual tool driving apparatus and operable to obtain driving information of the at least one visual tool driving apparatus; and a control apparatus in communication connection with the master manipulator, the at least one master manipulator driving apparatus, the at least one surgical tool driving apparatus and the at least one visual tool driving apparatus, wherein the control apparatus is configured to perform a control method comprising:

generating a first driving signal to drive a motion of a motor of a master manipulator such that the master manipulator is controlled to move to a target posture that is consistent with a current posture of a visual tool;

implementing a motion control between the master manipulator and the visual tool to adjust a field of view of a camera of the visual tool;

generating a second driving signal to drive a motion of the motor of the master manipulator such that the master manipulator is controlled to move to a target posture that is consistent with a current posture of an image of a surgical tool in a display; and implementing a master-slave motion control between the master manipulator and the surgical tool through a plurality of control cycles, wherein the method further comprises: in each control cycle, determining a current pose of the master manipulator, the current pose comprising a current position and a current posture;

determine a target pose of the surgical tool based on the current pose of the master manipulator and a pose relationship between the master manipulator and the surgical tool; and generating a control signal for controlling a motion of the surgical tool based on the target pose of the surgical tool.

18. The robot system according to claim 17, wherein the control method further comprises:

determining a previous pose of the master manipulator;

determining a current pose of the surgical tool; and determining the target pose of the surgical tool based on the previous pose and the current pose of the master manipulator and the current pose of the surgical tool.

19. A non-transitory computer-readable storage medium for storing at least one instruction that, when executed by a computer, causes a robot system to perform a master-slave motion control method, the method comprising:

generating a first driving signal to drive a motion of a motor of a master manipulator such that the master manipulator is controlled to move to a target posture that is consistent with a current posture of a visual tool;

implementing a motion control between the master manipulator and the visual tool to adjust a field of view of a camera of the visual tool;

generating a second driving signal to drive a motion of the motor of the master manipulator such that the master manipulator is controlled to move to a target posture that is consistent with a current posture of an image of a surgical tool in a display; and implementing a master-slave motion control between the master manipulator and the surgical tool through a plurality of control cycles, wherein the method further comprises: in each control cycle, determining a current pose of the master manipulator, the current pose comprising a current position and a current posture;

determining a target pose of the surgical tool based on the current pose of the master manipulator and a pose relationship between the master manipulator and the surgical tool; and generating a control signal for controlling a motion of the surgical tool based on the target pose of the surgical tool.

* * * * *